United States Patent
Lee et al.

(10) Patent No.: US 8,905,171 B2
(45) Date of Patent: Dec. 9, 2014

(54) BATTERY PACK WITH HIGH STRUCTURAL RELIABILITY

(71) Applicant: LG Chem, Ltd., Seoul (KR)

(72) Inventors: BumHyun Lee, Seoul (KR); Yong Shik Shin, Daejeon (KR); Jin Kyu Lee, Daejeon (KR); Jong Moon Yoon, Daejeon (KR); YeonSeok Choo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/012,368

(22) Filed: Aug. 28, 2013

(65) Prior Publication Data

US 2013/0341111 A1  Dec. 26, 2013

Related U.S. Application Data

(63) Continuation of application No. PCT/KR2012/003872, filed on May 17, 2012.

(30) Foreign Application Priority Data

May 19, 2011 (KR) .................... 10-2011-0047134

(51) Int. Cl.
| | |
|---|---|
| *B60L 11/00* | (2006.01) |
| *B60L 11/18* | (2006.01) |
| *H01M 2/10* | (2006.01) |
| *B60K 1/04* | (2006.01) |
| *H01M 10/625* | (2014.01) |
| *H01M 10/0525* | (2010.01) |

(52) U.S. Cl.
CPC . *B60K 1/04* (2013.01); *B60L 11/18* (2013.01); *H01M 2/1083* (2013.01); *H01M 10/0525* (2013.01); *B60K 2001/0416* (2013.01); *Y02T 10/7011* (2013.01); *H01M 2/1077* (2013.01); *B60L 11/1877* (2013.01); *H01M 10/5016* (2013.01); *Y02E 60/122* (2013.01)
USPC .......................................... 180/68.5; 429/159

(58) Field of Classification Search
CPC .. B60K 1/04; B60K 28/14; B60K 2001/0438; B60K 2001/005; B60L 11/1877; H01M 2/1083

USPC .......... 180/68.5; 429/159, 120, 100, 163, 176, 429/186
See application file for complete search history.

(56) References Cited

U.S. PATENT DOCUMENTS

| | | | | |
|---|---|---|---|---|
| 5,390,754 A | * | 2/1995 | Masuyama et al. | 180/68.5 |
| 5,501,289 A | * | 3/1996 | Nishikawa et al. | 180/68.5 |

(Continued)

FOREIGN PATENT DOCUMENTS

| | | |
|---|---|---|
| KR | 10-2007-0112490 A | 11/2007 |
| KR | 10/2008-0027504 A | 3/2008 |

(Continued)

OTHER PUBLICATIONS

International Search Report issued in PCT/KR2012/003872, mailed on Nov. 26, 2012.

*Primary Examiner* — Katy M Ebner
*Assistant Examiner* — Emma K Frick
(74) *Attorney, Agent, or Firm* — Birch, Stewart, Kolasch & Birch, LLP

(57) ABSTRACT

Disclosed is a battery pack including a battery module array having battery modules arranged in two or more rows in a state in which the battery modules are erected in an upside-down fashion, each of the battery modules being formed by stacking battery cells or unit modules, each having two or more battery cells mounted therein, in a lateral direction with respect to electrode terminals of the battery cells, a front support member and a rear support member that are a pair of side support members to support the front and rear of the battery module array, respectively, lower end support members coupled to lower ends of the side support members, and mounting members coupled to an upper end of the battery module array and fastened to an external device such that an upper part of the battery pack is mounted to the external device.

21 Claims, 6 Drawing Sheets

(56) References Cited

U.S. PATENT DOCUMENTS

| | | | |
|---|---|---|---|
| 6,227,322 B1* | 5/2001 | Nishikawa | 180/68.5 |
| 7,051,825 B2* | 5/2006 | Masui et al. | 180/68.5 |
| 7,144,039 B2* | 12/2006 | Kawasaki et al. | 280/784 |
| 7,270,208 B2* | 9/2007 | Huang | 180/68.5 |
| 7,396,075 B2* | 7/2008 | Ohkuma et al. | 297/180.1 |
| 7,413,045 B2* | 8/2008 | Tien | 180/68.5 |
| 7,610,978 B2* | 11/2009 | Takasaki et al. | 180/68.5 |
| 7,654,351 B2* | 2/2010 | Koike et al. | 180/68.5 |
| 7,654,352 B2* | 2/2010 | Takasaki et al. | 180/68.5 |
| 7,688,582 B2* | 3/2010 | Fukazu et al. | 361/690 |
| 7,690,686 B2* | 4/2010 | Hashimura et al. | 280/782 |
| 7,717,207 B2* | 5/2010 | Watanabe et al. | 180/68.5 |
| 7,836,999 B2* | 11/2010 | Kato | 180/312 |
| 7,905,307 B2* | 3/2011 | Kubota et al. | 180/68.1 |
| 7,926,602 B2* | 4/2011 | Takasaki | 180/68.5 |
| 7,931,105 B2* | 4/2011 | Sato et al. | 180/68.5 |
| 7,997,368 B2* | 8/2011 | Takasaki et al. | 180/68.5 |
| 8,037,960 B2* | 10/2011 | Kiya | 180/68.5 |
| 8,051,934 B2* | 11/2011 | Kiya et al. | 180/68.5 |
| 8,079,435 B2* | 12/2011 | Takasaki et al. | 180/68.5 |
| 8,276,697 B2* | 10/2012 | Takasaki | 180/68.5 |
| 8,372,530 B2* | 2/2013 | Kubota et al. | 429/100 |
| 8,511,412 B2* | 8/2013 | Kawaguchi et al. | 180/68.5 |
| 8,556,017 B2* | 10/2013 | Kubota et al. | 180/68.5 |
| 8,567,543 B2* | 10/2013 | Kubota et al. | 180/68.5 |
| 2008/0283317 A1* | 11/2008 | Wagner et al. | 180/68.5 |
| 2009/0214936 A1 | 8/2009 | Yang et al. | |
| 2009/0226806 A1* | 9/2009 | Kiya | 429/186 |
| 2009/0267906 A1 | 10/2009 | Schroderus | |
| 2010/0141214 A1 | 6/2010 | Yoon et al. | |
| 2011/0011654 A1* | 1/2011 | Kubota et al. | 180/65.21 |
| 2012/0097466 A1* | 4/2012 | Usami et al. | 180/68.5 |

FOREIGN PATENT DOCUMENTS

| | | |
|---|---|---|
| KR | 10-2008-0047639 A | 5/2008 |
| KR | 10-2008-0047640 A | 5/2008 |
| KR | 10-2008-0047641 A | 5/2008 |
| KR | 10/2010-0071100 A | 6/2010 |
| KR | 10-1026745 B1 | 4/2011 |

* cited by examiner

Prior Art

BATTERY PACK WITH HIGH STRUCTURAL RELIABILITY

CROSS REFERENCE TO RELATED APPLICATIONS

This application is a Bypass Continuation of PCT International Application No. PCT/KR2012/003872 filed on May 17, 2012, which claims priority under 35 U.S.C §119 (a) to Patent Application No. 10-2011-0047134 filed in the Republic of Korea on May 19, 2011, all of which are hereby expressly incorporated by reference into the present application.

TECHNICAL FIELD

The present invention relates to a battery pack with high structural reliability and, more particularly, to a battery pack including a battery module array having battery modules arranged in two or more rows in a state in which the battery modules are erected in an upside-down fashion, each of the battery modules being formed by stacking battery cells or unit modules, each having two or more battery cells mounted therein, in a lateral direction with respect to electrode terminals of the battery cells, a front support member and a rear support member that are a pair of side support members to support the front and rear of the battery module array, respectively, in a state in which the pair of side support members are in close contact with outermost unit modules in the battery modules in the battery module array, lower end support members coupled to lower ends of the side support members to support a lower end of the battery module array, and mounting members coupled to an upper end of the battery module array and fastened to an external device such that an upper part of the battery pack is mounted to the external device.

BACKGROUND ART

One of the biggest problems caused by vehicles using fossil fuel such as gasoline and diesel is the creation of air pollution. Technology of using a secondary battery, which can be charged and discharged, as a power source for vehicles has attracted considerable attention as one method of solving such a problem. As a result, electric vehicles (EV), which are operated using only a battery, and hybrid electric vehicles (HEV), which jointly use a battery and a conventional engine, have been developed and some are commercially available. A nickel-metal hydride (Ni—MH) secondary battery has mainly been used as a power source for electric vehicles (EV) and hybrid electric vehicles (HEV). A lithium-ion battery has also been used recently.

High power and large capacity are needed for such a secondary battery to be used as a power source for electric vehicles (EV) and hybrid electric vehicles (HEV). To this end, small-scale secondary batteries (unit cells) are connected in series to form a battery module and a battery pack. Where appropriate, small-scale secondary batteries (unit cells) are connected in series and in parallel to form a battery module and a battery pack.

Generally, such a battery pack has a structure to protect battery modules, each of which includes secondary batteries mounted therein. The structure of the battery module may be varied based on the kind of vehicles or the installation position of the battery pack in vehicles.

In one structure to effectively fix large-capacity battery modules, a battery pack is constructed such that battery modules are fixed to a rigid lower plate. In this structure, each individual battery module is fixed to the lower plate such that reliability of the battery pack such as durability and vibration resistance is secured through structural rigidity of the lower plate. However, this structure has a problem in that there is a need to secure sufficient rigidity of the lower plate.

FIG. 1 is an exemplary perspective view of a conventional battery pack including a single battery module as an example of a battery pack having the above structure.

Referring to FIG. 1, a battery pack 100 includes unit modules 10, each of which has secondary batteries mounted therein, a lower plate 20, a pair of side support members 30, and a pair of top support members 40.

The unit modules 10 are stacked at the top of the lower plate 20 in a state in which the unit modules 10 are vertically erected. The side support members 30 are disposed in close contact with the outer sides of the outermost unit modules 10 in a state in which the lower end of each of the side support members 30 is fixed to the lower plate 20.

The top support members 40 are connected between the upper parts of the side support members 30 to interconnect and support the side support members 30.

However, the above battery pack structured such that the unit modules 10 are fixed on the lower plate 20 has a problem in that it is difficult to prevent vibration, impact or the like from being transferred to the battery pack in an environment in which the vehicle often suddenly starts and suddenly stops.

Thus, there is a great need to provide a battery pack that can significantly reduce vibration, impact and the like transferred to the battery pack mounted in a vehicle.

DISCLOSURE

Technical Problem

Therefore, the present invention has been made to solve the above and other technical problems that have yet to be resolved.

It is an object of the present invention to provide a battery pack that is configured such that unit modules are mounted upwardly and fixed at the upper side in a state in which the unit modules are erected in an upside-down fashion when the battery pack is installed in a vehicle, such that external impact transferred to the battery pack can be significantly reduced by a moment of force.

It is another object of the present invention to provide a battery pack wherein each of first upper mounting members, a second upper mounting member and a rear mounting member has the shape of an angular pipe that is angular in vertical section, such that it is possible to minimize deformation due to vertical vibration and impact.

It is another object of the present invention to provide a battery pack wherein a portion of the battery pack is formed using a part of the structure of a vehicle, such that it is possible to stably install the battery pack in the vehicle while minimizing the volume of the battery pack in the vehicle.

Technical Solution

In accordance with the present invention, the above and other objects can be accomplished by the provision of a battery pack including a battery module array having battery modules arranged in two or more rows in a state in which the battery modules are erected in an upside-down fashion, each of the battery modules being formed by stacking battery cells or unit modules, each having two or more battery cells mounted therein, in a lateral direction with respect to electrode terminals of the battery cells, a front support member and a rear support member that are a pair of side support members to support the front and rear of the battery module array, respectively, in a state in which the pair of side support members are in close contact with outermost unit modules in the battery modules in the battery module array, lower end support members coupled to lower ends of the side support members to support a lower end of the battery module array, and mounting members coupled to an upper end of the battery module array and fastened to an external device such that an upper part of the battery pack is mounted to the external device.

The pair of side support members support the front and rear of the battery module array, respectively. Therefore, it is possible to securely increase bending rigidity of the lower end support member coupled to the lower ends of the side support members and to sufficiently secure overall structural reliability of the battery pack against vertical vibration.

In addition, since the battery modules are mounted in a state in which the battery modules are erected in an upside-down fashion, it is possible to minimize vibration or impact transferred to the battery pack depending on variation in the moment of force.

Preferably, each of the battery cells is a plate-shaped battery cell, which provides a high stack rate in a limited space. For example, each of the battery cells may be structured such that an electrode assembly is mounted in a battery case formed of a laminate sheet.

Specifically, each of the battery cells is a pouch-shaped secondary battery in which an electrode assembly having a cathode, anode and a separator interposed therebetween is sealed, together with an electrolyte, within a battery case. For example, each of the battery cells is a plate-shaped secondary battery with an approximately rectangular parallelepiped structure having a small thickness to width ratio. Generally, the pouch-shaped secondary battery includes a pouch-shaped battery case. The battery case has a laminate sheet structure in which an outer coating layer formed of a polymer resin exhibiting high durability, a barrier layer formed of a metallic material blocking moisture or air, and an inner sealant layer formed of a thermally-weldable polymer resin are sequentially stacked.

The mounting members may include two or more first upper mounting members coupled to upper ends of the side support members and upper ends of the battery modules erected in an upside-down fashion, each of the first upper mounting members being fastened at one end thereof to an external device, a second upper mounting member coupled to upper ends of the first upper mounting members such that the second upper mounting member intersects the first upper mounting members at right angles, the second upper mounting member being fastened at opposite ends thereof to the external device, and a rear mounting member disposed at one side of the battery module array, the rear mounting member being fastened at opposite ends thereof to the external device.

In the above structure, each of the first upper mounting members, the second upper mounting member and the rear mounting member is a hollow quadrangular bar having the shape of an angular pipe that is angular in vertical section. Therefore, deformation of the battery pack due to vibration and impact can be minimized by the angular pipe which has a high moment of inertia.

Specifically, the angular pipe may have the shape of a hollow quadrangular bar or a closed quadrangular bar. Preferably, the angular pipe has the shape of a hollow quadrangular bar. Such shapes have a high moment of inertia, increasing shock resistance against vibration of the battery pack, as compared to a conventional frame that is I-shaped or is formed of a plate bent in a specific shape. The above term "quadrangular bar shape" may be construed as including not only a quadrangular shape but also a shape having sharp corners, a shape having rounded corners, a shape having one or two linear sides, or a shape having one or two gently-curved sides.

Each of the side support members preferably includes a main body that is in contact with outermost unit modules in the battery modules in the battery module array, an upper end wall and a lower end wall, each being shaped to protrude outwardly from the perimeter of the main body, and a pair of side walls to disperse pressure (or bending load) applied by the battery modules and the lower end support member. Here, the term "outwardly" refers to a direction opposite to the direction of the pressure, i.e., a direction opposite to the direction from the main body of the side support member to the battery modules and the lower end support member.

In the battery pack according to the present invention, the battery modules erected in an upside-down fashion are brought into close contact with each other by the side support members, in a state in which the lower ends of the battery modules are coupled to the first upper mounting members, and the side support members are fixed by the lower end support member. Therefore, it is possible to prevent the unit modules of each of the battery modules from swelling and moving in the thickness direction thereof, thereby improving safety of the battery modules and effectively preventing deterioration in performance of the battery modules.

In a preferred example of the above structure, the upper end walls of the side support members may be coupled to the first upper mounting members by welding or bolting.

Meanwhile, the shape of each of the side support members is not particularly limited so long as the side support members can easily support the front and rear of the battery module array. For example, each of the side support members may have a rectangular shape in plan view.

A lower plate, opposite ends of which are coupled to the side support members, may be further mounted to lower parts of the lower end support members to prevent downward movement of the battery module array in cooperation with the lower end support member when external force is applied to the battery pack.

In a preferred example, when the battery modules are arranged in two rows to constitute a battery module array, the lower end support members may include four members to support the lower ends of the opposite sides of each of the battery modules.

The structure of each of the first upper mounting members is not particularly limited so long as the lower ends of the battery modules erected in an upside-down fashion can be easily mounted to the first upper mounting members. For example, the first upper mounting members may include two opposite end members coupled to upper parts of opposite sides of the battery module array and a middle member coupled to the middle of the battery module array. Therefore, the first upper mounting members can uniformly support the weight of the battery module array.

The weight of the battery modules erected in an upside-down fashion is transferred to the lower side toward which gravity is directed. Therefore, the battery modules move relatively little upon receiving external impact, thereby improving structural reliability of the battery pack.

The end of each of the first upper mounting members fastened to the external device is preferably bent upward by the height of the second upper mounting member coupled to the upper ends of the first upper mounting members, such that the ends of the first upper mounting members and the top of the second upper mounting member are positioned at the same level.

Where appropriate, the battery pack may further include an upper plate mounted between the battery module array and the first upper mounting members to reinforce the top of the battery module array.

In an example of the above structure, the battery module array may be coupled to the upper plate fixed to the lower ends of the first upper mounting members such that the first upper mounting members support the weight of the battery module array.

In another example, portions of the upper plate corresponding to the first upper mounting members may be recessed to lower the overall height of the battery pack.

Meanwhile, the battery pack generally includes an electrically wired structure. Thus, the lower plate may extend to the rear of the rear mounting member to secure a space through which a wire, such as an electric wire, extends.

Where appropriate, the other ends of the first upper mounting members may be coupled to the upper end of the rear mounting member to increase coupling force between the first upper mounting members and the rear mounting member.

In another example, the battery pack may further include a reinforcing bracket coupled to the upper ends of the first upper mounting members, the reinforcing bracket being mounted parallel to the second upper mounting member, to further reinforce the coupling structure between the first upper mounting members and the second upper mounting member.

The battery pack may further include a U-shaped bracket mounted to the upper end of at least one of the first upper mounting members to fix a safety plug.

In an example, the structure of the rear mounting member is not particularly limited so long as the rear mounting member can easily cover opposite sides and the bottom of a cooling fan mounted to the rear of the battery module array. Preferably, the rear mounting member has a U-shaped frame structure.

The rear mounting member allows efficient use of the limited inner space of the vehicle.

In another example, the opposite ends of the rear mounting member may be bent parallel to the second upper mounting member and fastening holes may be formed at the bent portions of the rear mounting member to achieve easy coupling to the external device.

The present invention also provides a device including the battery pack as a power source.

The device may be a vehicle selected from the group consisting of an electric vehicle, a hybrid electric vehicle and a plug-in hybrid electric vehicle. Of course, the battery pack used as a power source of the vehicle may be manufactured by combining battery modules based on desired power and capacity.

The battery pack according to the present invention is structured such that the size of the top of the battery pack is greater than that of the bottom. Therefore, the battery pack is preferably installed in a spare tire space under the trunk of the vehicle or between a rear seat and the trunk of the vehicle.

The electric vehicle, the hybrid electric vehicle, the plug-in hybrid electric vehicle or the like that use the battery pack as a power source thereof are well known in the art and therefore a detailed description thereof will not be given.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, embodiments of the present invention will be described in detail with reference to the accompanying drawings. However, it should be noted that the description of the embodiments is given to provide better understanding of the present invention without limiting the scope of the invention.

Figure 1:
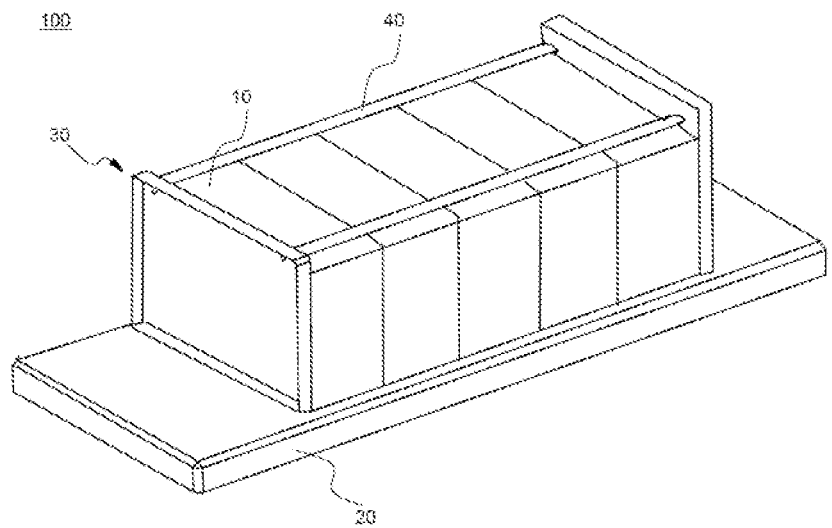
FIG. 1 is a perspective view of a conventional battery pack.
Figure 2:
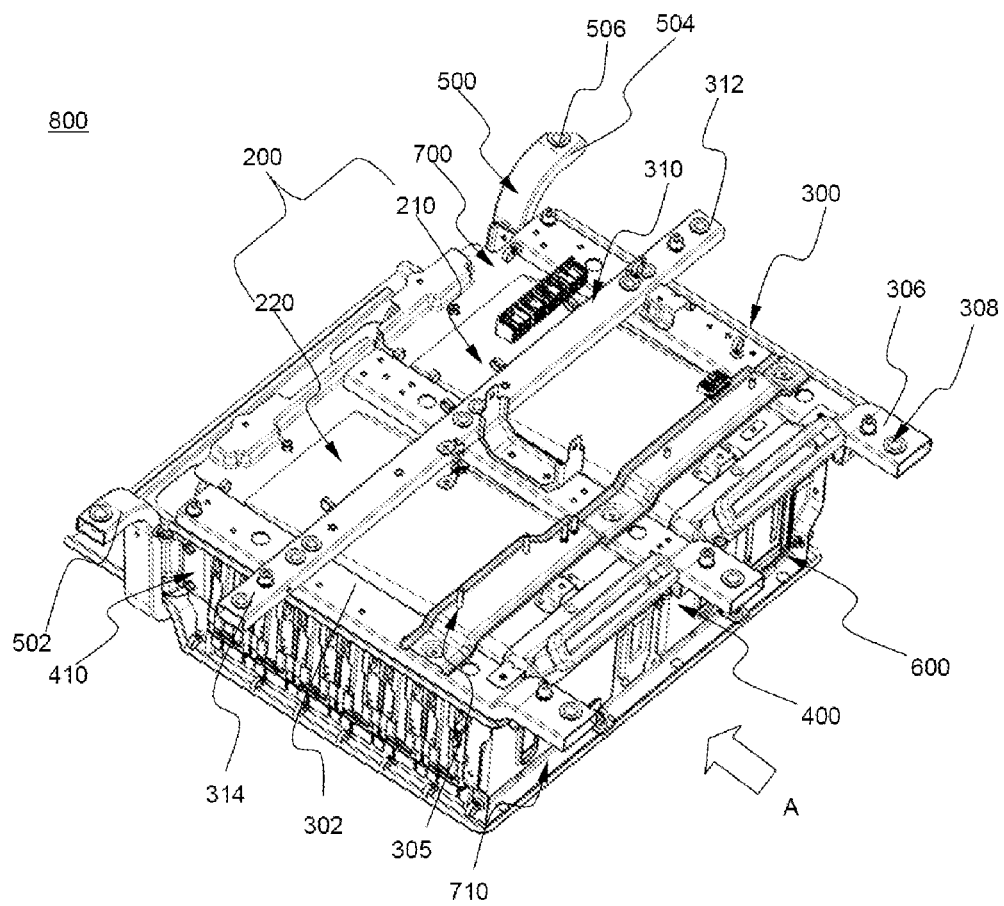
FIG. 2 is a perspective view of a battery pack according to one embodiment of the present invention.
Figure 3:
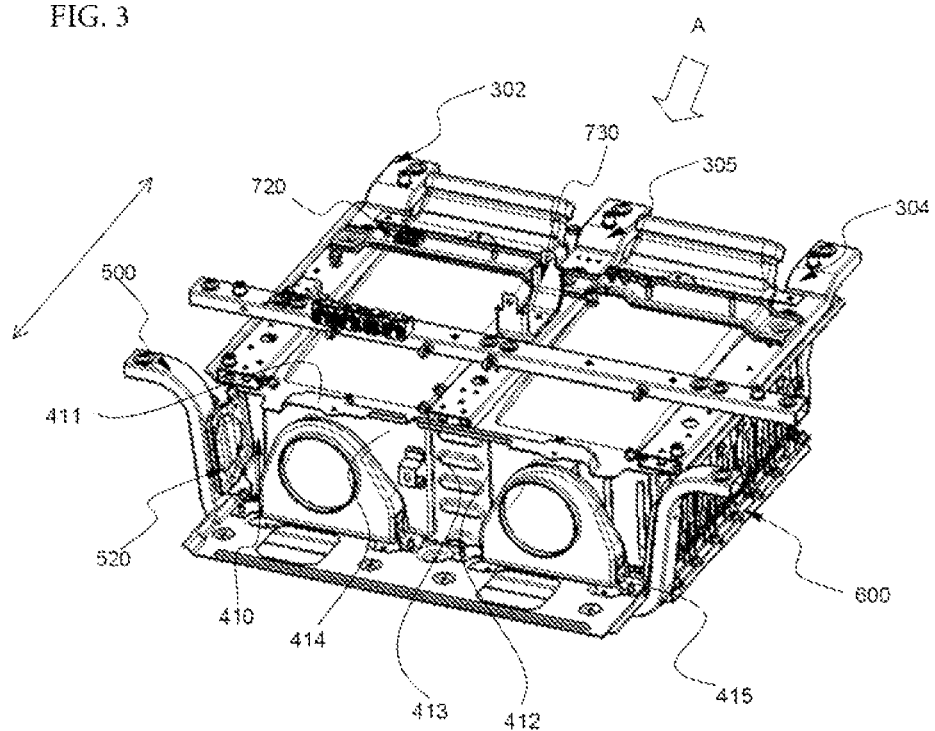
FIG. 3 is a rear perspective view of the battery pack of FIG. 2.

FIG. 2 is a schematic perspective view of a battery pack according to an embodiment of the present invention and FIG. 3 is a schematic rear perspective view of the battery pack of FIG. 2.

Figure 4:
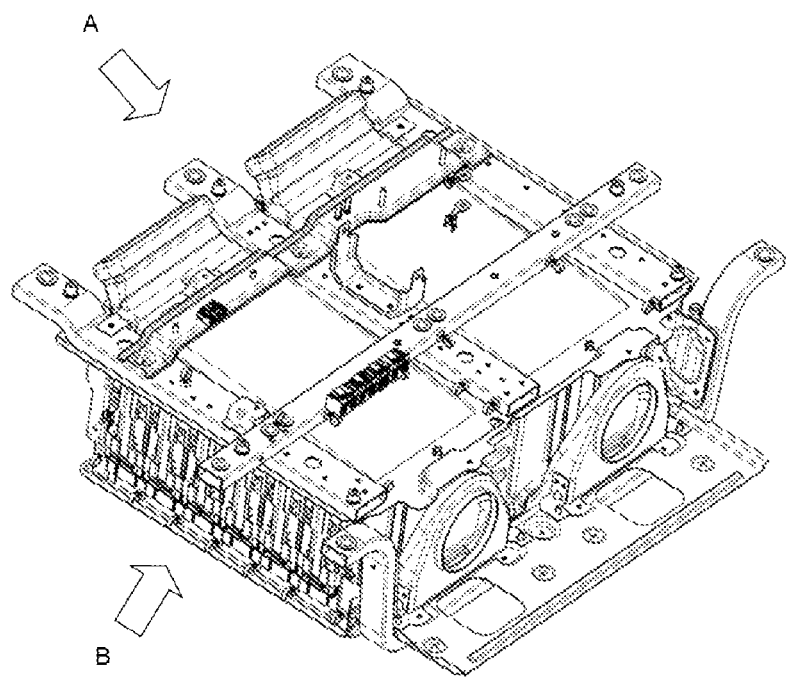
FIG. 4 is a side perspective view of the battery pack of FIG. 2.
Figure 5:
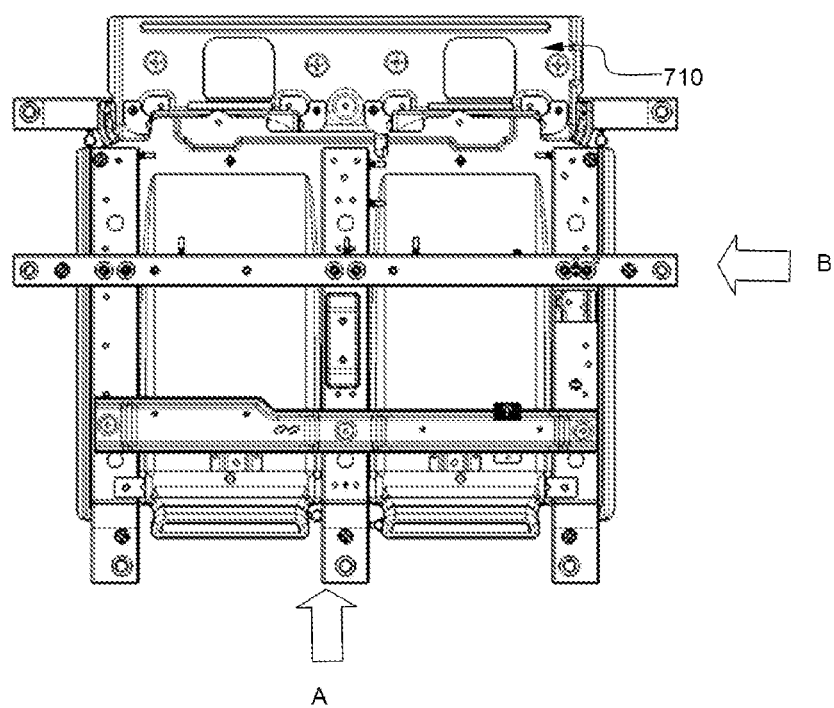
FIG. 5 is a top perspective view of the battery pack of FIG. 2.

FIG. 4 is a schematic side perspective view of the battery pack of FIG. 2 and FIG. 5 is a schematic top perspective view of the battery pack of FIG. 2.

As shown in FIGS. 2 to 5, a battery pack 800 includes a battery module array 200, a pair of side support members (i.e., a front support member 400 and a rear support member 410), a lower end support member 600, three first upper mounting members 300, a second upper mounting member 310 and a rear mounting member 500.

The battery module array 200 includes battery modules 210 and 220 arranged in two rows. Each of the battery modules 210 and 220 has a structure in which unit modules are stacked with each unit module being erected in an upside-down fashion. The front support member 400 and the rear support member 410 support the front and rear of the battery module array 200, respectively, in a state in which the front support member 400 and the rear support member 410 are in close contact with outermost unit modules in the battery modules in the battery module array 200.

The lower end support members 600 are coupled to the lower ends of the front support member 400 and the rear support member 410 to support the lower end of the battery module array 200.

The first upper mounting members 300 are coupled to the upper ends of the front support member 400 and the rear support member 410 and the lower ends of the battery modules 210 and 220 erected in an upside-down fashion and are fastened to an external device through fastening holes 308 formed in one ends 306 of the first upper mounting members 300.

The second upper mounting member 310 intersects the first upper mounting members 300 at right angles. The second upper mounting member 310 is coupled to the upper ends of the first upper mounting members 300 and is fastened to an external device (for example, a vehicle) through fastening holes 308 formed in opposite ends 312 and 314 of the second upper mounting members 310.

The rear mounting member 500 is located at the rear of the battery module array 200 and is fastened to the external device through fastening holes 506 formed in opposite ends 502 and 504 of the rear mounting member 500.

Each of the first upper mounting members 300, the second upper mounting member 310 and the rear mounting member 500 has the shape of an angular pipe that is angular in vertical section and, specifically, has the shape of a hollow quadrangular bar.

To determine vibration characteristics of the battery pack of FIG. 2 in a structure (structure 1) in which the first upper mounting members and the second upper mounting member are each formed of a general frame and in a structure (structure 2) in which the first upper mounting members and the second upper mounting member are each formed of an angular pipe, resonance point detection analysis was carried out in three deformation modes in which external force was applied to the battery pack in a lateral direction, in a front-rear direction and in a vertical direction, respectively. Results are shown in Table 1 below.

TABLE 1

| Deformation Mode | Battery Pack Structure | Resonant Frequency |
|---|---|---|
| Lateral deformation mode | Structure 1 | 29.5 Hz |
|  | Structure 2 | 34.5 Hz |
| Front-rear deformation mode | Structure 1 | 49.8 Hz |
|  | Structure 2 | 53.7 Hz |
| Vertical deformation mode | Structure 1 | 55.9 Hz |
|  | Structure 2 | 65.5 Hz |

As can be seen from Table 1, since battery modules are fixed to the first upper mounting members 300 and the second upper mounting member 310 that are each formed of an angular pipe in structure 2, the structural reliability of structure 2 is greatly improved even when the battery pack vibrates at a high rate in each of the deformation modes, as compared to structure 1 in which battery modules are fixed to the first upper mounting members 300 and the second upper mounting member 310 that are each formed of a frame.

The experimental results unexpectedly showed that durability of the battery pack can be greatly improved simply by forming the first upper mounting members 300 and the second upper mounting member 310 using angular pipes that have a high moment of inertia.

The battery module array 200 can reduce the level of vibration, impact or the like as the moment of inertia increases since the unit modules are stacked in a state in which the unit modules are erected in an upside-down fashion as described above. Therefore, the battery pack according to the present invention can be practically applied to a vehicle that uses a battery pack having a weight of 30 kg or greater as a power source and that is subject to vertical vibration.

Each of the front support member 400 and the rear support member 410 has a rectangular shape in plan view and includes a main body 414 that is in contact with outermost unit modules in the battery modules in the battery module array 200, an upper end wall 411 and a lower end wall 415, each being shaped to protrude outwardly from the perimeter of the main body, and a pair of side walls 412, 413.

The upper end wall of the front support member 400 is coupled to the first upper mounting members 300 by bolting.

The lower plate 710 are mounted to lower parts of the lower end support members 600 in a state in which opposite ends of the lower plate 710 are coupled to the front support member 400 and the rear support member 410, respectively. The lower plate 710 extends to the rear of the rear mounting member 500 to secure a space through which a wire (not shown) extends.

The lower end support member 600 includes four members that support lower ends of opposite sides of the battery modules 210 and 220.

The first upper mounting members 300 include two opposite end members 302 and 304 coupled respectively to upper parts of opposite sides of the battery module array 200 and a middle member 305 coupled to the middle of the battery module array 200. The ends 306 of the first upper mounting members 300, at which the first upper mounting members 300 are fastened to the external device, are preferably bent upward by the height of the second upper mounting member 310.

An upper plate 700 is mounted between the battery module array 200 and the first upper mounting members 300. The battery module array 200 is coupled to the upper plate 700 fixed to lower ends of the first upper mounting members 300 such that the first upper mounting members 300 support the mass of the battery module array 200.

The upper plate 700 is recessed at portions thereof corresponding to the first upper mounting members 300.

A reinforcing bracket 720 is mounted parallel to the second upper mounting member 310 in a state in which the reinforcing bracket 720 is coupled to upper ends of the first upper mounting members 300. A U-shaped bracket 730 is mounted to the upper end of the middle member 305 to fix a safety plug (not shown). Therefore, the battery pack according to the present invention is efficiently installed in the limited space of the vehicle.

The rear mounting member 500 has a U-shaped frame structure to cover the bottom and opposite sides of a cooling fan (not shown) mounted to the rear of the battery module array 200.

The opposite ends 502 and 504 of the rear mounting member 500 are bent parallel to the second upper mounting member 310 and fastening holes 506 are formed at the bent portions of the rear mounting member 500 to achieve easy coupling to the external device.

At the rear of the battery pack 800, the reinforcing bracket 520 is coupled to the rear support member 410 and the rear mounting member 500 to prevent the battery pack from swinging in a front-rear direction (denoted by an arrow).

Figure 6:
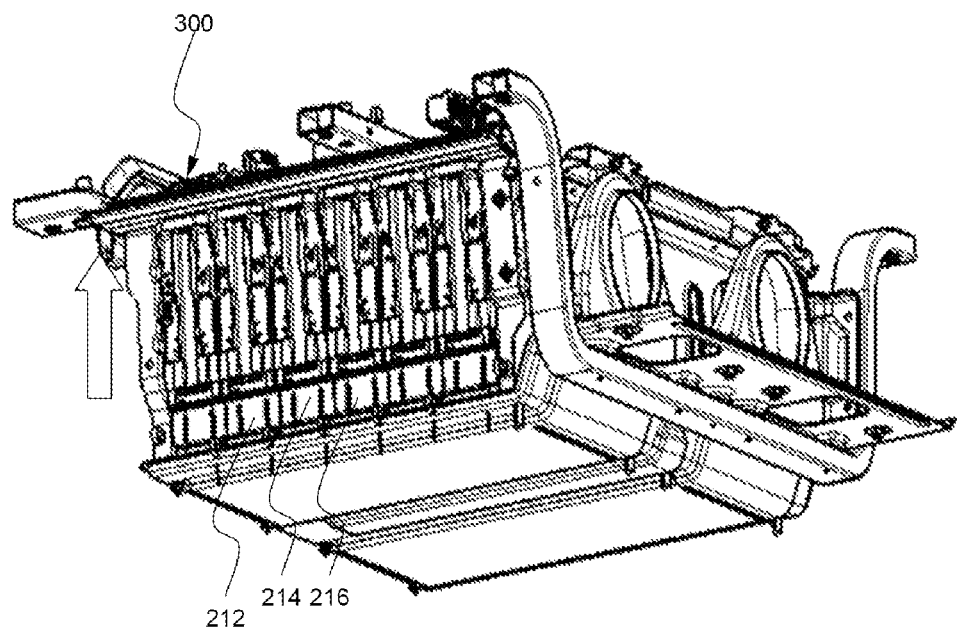
FIG. 6 is a perspective view of a structure of the battery pack in which battery modules are erected in an upside-down fashion.
Figure 7:
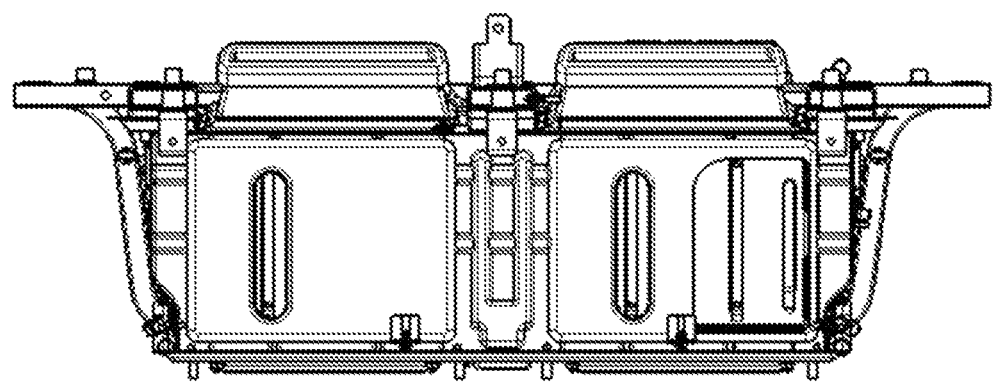
FIG. 7 is a front perspective view of the battery pack of FIG. 2.

FIG. 6 is a schematic perspective view of a structure of the battery pack in which battery modules are erected in an upside-down fashion and FIG. 7 is a schematic front perspective view of the battery pack of FIG. 2.

As shown in FIGS. 6 and 7, unit modules 212, 214 and 216 are assembled to the first upper mounting member 300 in a state in which the unit modules 212, 214 and 216 are erected in an upside-down fashion. This reduces swinging of the battery pack since the moment of force increases, as compared to the conventional battery pack structure in which unit modules are downwardly mounted and fixed at the lower side.

It will be apparent to those skilled in the art that various modifications and variations are possible in light of the above teaching without departing from the scope of the invention.

INDUSTRIAL APPLICABILITY

As is apparent from the above description, a battery pack according to the present invention is configured such that unit modules are mounted upwardly and fixed at the upper side in a state in which the unit modules are erected in an upside-down fashion when the battery pack is installed in a vehicle. Therefore, external impact transferred to the battery pack can be significantly reduced by moment of force. It is also possible to minimize deformation due to vertical vibration and impact since each of the first upper mounting members and the second upper mounting member has the shape of an angular pipe that is angular in vertical section.

In addition, battery modules are assembled upwardly to the first upper mounting members and the second upper mounting member which are each formed of an angular pipe structure. Therefore, the weight of the battery pack can be supported by the angular pipe structure and the battery pack can be compactly constructed.

Moreover, it is possible to stably install the battery pack in a vehicle while minimizing the volume of the battery pack in the vehicle since a portion of the battery pack is formed using a part of the structure of the vehicle.

The invention claimed is:

1. A battery pack comprising:
a battery module array having battery modules arranged in two or more rows each of the battery modules being formed by stacking battery cells or unit modules, each unit module having two or more battery cells mounted therein, in a lateral direction with respect to electrode terminals of the battery cells;
a front support member and a rear support member that are a pair of side support members to support the front and rear of the battery module array, respectively, in a state in which the pair of side support members are in contact with outermost unit modules or battery cells in the battery modules in the battery module array;
lower end support members coupled to lower ends of the side support members to support a lower end of the battery module array; and
mounting members coupled to an upper end of the battery module array and fastened to an external device such that an upper part of the battery pack is mounted to the external device,
wherein the mounting members comprise:
two or more first upper mounting members coupled to upper ends of the side support members and upper ends of the battery modules or battery cells, each of the first upper mounting members being fastened at one end thereof to the external device;
a second upper mounting member coupled to upper ends of the first upper mounting members such that the second upper mounting member intersects the first upper mounting members at right angles, the second upper mounting member being fastened at opposite ends thereof to the external device; and
a rear mounting member disposed at one side of the battery module array, the rear mounting member being fastened at opposite ends thereof to the external device,
wherein the end of each of the first upper mounting members fastened to the external device is bent upward such that an end of each of the first upper mounting members fastened to the external device is bent upward a height of the second upper mounting member so that upper surfaces of the bent portion of the first upper mounting members is at the same elevation as a top of the second upper mounting member.

2. The battery pack according to claim 1, wherein each of the battery cells is a plate-shaped battery cell.

3. The battery pack according to claim 1, wherein each of the battery cells is structured such that an electrode assembly is mounted in a laminated battery case.

4. The battery pack according to claim 1, wherein each of the first upper mounting members, the second upper mounting member and the rear mounting member is a hollow quadrangular bar having the shape of an angular pipe.

5. The battery pack according to claim 1, wherein each of the side support members comprises:
a main body that is in contact with the outermost unit modules or battery cells in the battery modules in the battery module array;
an upper end wall and a lower end wall, each being shaped to protrude outwardly from the perimeter of the main body; and
a pair of side walls.

6. The battery pack according to claim 5, wherein the upper end walls of the side support members are coupled to the first upper mounting members by welding or bolting.

7. The battery pack according to claim 1, wherein each of the side support members has a rectangular shape in plan view.

8. The battery pack according to claim 1, further comprising a lower plate mounted to lower parts of the lower end support members, the lower plate being coupled at opposite ends thereof to the side support members.

9. The battery pack according to claim 8, wherein the lower plate extends to the rear of the rear mounting member to secure a space through which a wire extends.

10. The battery pack according to claim 1, wherein the first upper mounting members comprise two opposite end members coupled to upper parts of opposite sides of the battery module array and a middle member coupled to a middle of the battery module array.

11. The battery pack according to claim 1, further comprising an upper plate mounted between the battery module array and the first upper mounting members.

12. The battery pack according to claim 11, wherein the battery module array is coupled to the upper plate fixed to lower ends of the first upper mounting members such that the first upper mounting members support the weight of the battery module array.

13. The battery pack according to claim 11, wherein the upper plate is recessed at portions thereof corresponding to the first upper mounting members.

14. The battery pack according to claim 1, wherein the other end of each of the first upper mounting members is coupled to an upper end of the rear mounting member.

15. The battery pack according to claim 1, further comprising a reinforcing bracket coupled to upper ends of the first upper mounting members, the reinforcing bracket being mounted parallel to the second upper mounting member.

16. The battery pack according to claim 1, further comprising a U-shaped bracket mounted to the upper end of at least one of the first upper mounting members to fix a safety plug.

17. The battery pack according to claim 1, wherein the rear mounting member has a U-shaped frame structure to cover opposite sides and the bottom of a cooling fan mounted to the rear of the battery module array.

18. The battery pack according to claim 1, wherein the opposite ends of the rear mounting member are bent parallel to the second upper mounting member and fastening holes are formed at the bent portions of the rear mounting member to achieve easy coupling to the external device.

19. An external device comprising the battery pack according to claim 1 as a power source.

20. The external device according to claim 19, wherein the device is a vehicle selected from the group consisting of an electric vehicle, a hybrid electric vehicle and a plug-in hybrid electric vehicle.

21. The external device according to claim 20, wherein the battery pack is installed in a lower part of a trunk of the vehicle or between a rear seat and the trunk of the vehicle.

* * * * *